P. WEBER.
ROAD MAP.
APPLICATION FILED SEPT. 14, 1910.
997,166.
Patented July 4, 1911.
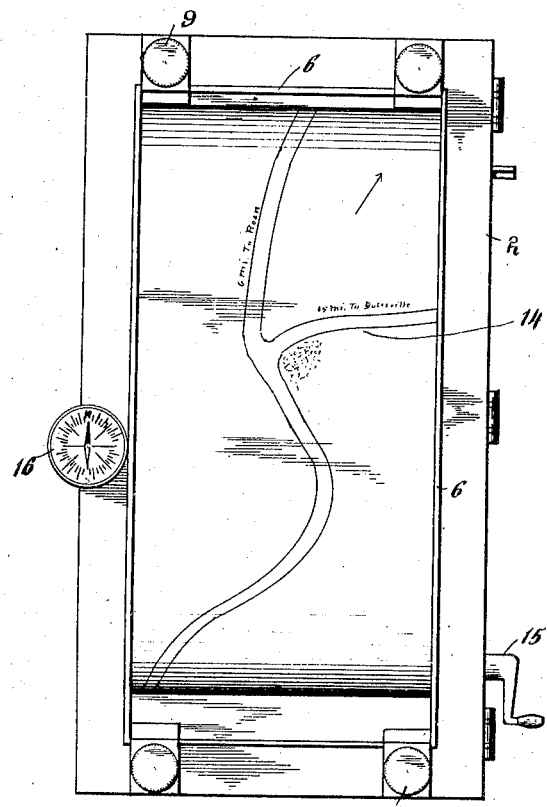
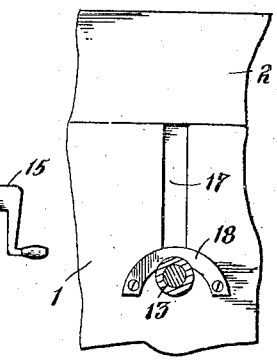
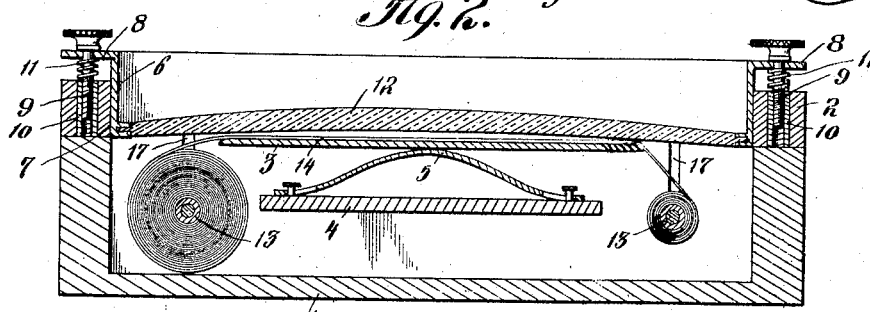
Witnesses
Inventor
Philip Weber
By Victor J. Evans
Attorney

UNITED STATES PATENT OFFICE.

PHILIP WEBER, OF GENOA JUNCTION, WISCONSIN.

ROAD-MAP.

997,166.  Specification of Letters Patent.  Patented July 4, 1911.

Application filed September 14, 1910. Serial No. 581,998.

*To all whom it may concern:*

Be it known that I, PHILIP WEBER, a citizen of the United States of America, residing at Genoa Junction, in the county of Walworth and State of Wisconsin, have invented new and useful Improvements in Road-Maps, of which the following is a specification.

This invention relates to road maps and particularly to one designed for use in connection with vehicles such as automobiles, motorcycles, bicycles or the like, the object of the invention being to provide a novel form of receptacle for the reception of the map and an adjustable magnifying glass arranged above the receptacle at a point immediately above that portion of the map which is to be viewed by the driver of the vehicle.

In the drawing, forming a portion of this specification and in which like numerals of reference indicate similar parts in the several views:—Figure 1 is a plan view of my improved map holder. Fig. 2 is a longitudinal section therethrough. Fig. 3 is a side view of a portion of the holder.

My improved map holder comprises a receptacle 1 which is provided at its upper end with a hingedly mounted closure 2. A horizontally disposed yieldingly supported table 3 is mounted in the receptacle 1 at a point immediately beneath the closure. A support 4 is fixed in the receptacle, and as shown, it has mounted thereon leaf springs 5 which engage the supporting table 3 to hold the same normally in an elevated position for a purpose to be hereinafter described.

A movable glass or lens carrier 6 is mounted in the opening 7 of the closure, and as shown, said carrier is provided with outwardly extending flanged upper portions 8. The end flanges of the carrier 6 are apertured for the reception of adjusting bolts 9 which extend downwardly into interiorly threaded sleeves 10 in the closure 2. Helical extensile springs 11 surround the bolts 9 and are interposed between the end flanges of the carrier 6 and the closure 2. These springs are employed so as to exert their tension against the carrier to hold the same normally in an elevated position. A magnifying glass or lens 12 is supported horizontally on the carrier 6, and as illustrated, it is disposed immediately above the supporting table 3.

Companion map-supporting rollers 13 are journaled in the side walls of the receptacle 1 and as illustrated, the map 14 which is formed preferably of a continuous sheet of material is preferably secured at its opposite ends to the rollers 13 so that the map may be wound from one roller to the other as the occasion may demand. The map is accurately laid out so that the desired section of the country may be brought into view of the driver of the vehicle so as to enable him to direct himself when not acquainted with the road on which he is traveling. The map extends over the table 3 and, incident to the fact that said table is yieldingly supported, that portion of the map between the rollers will be operatively associated with respect to the glass or lens 12, obviating sagging of the intermediate portion of the map as will be understood. As it is desirable to employ a magnifying glass means must be employed for adjusting the same toward or away from the exposed portion of the map so as to obtain the desired focus thereon, hence the provision of the adjusting bolts 9. A crank handle 15 is interchangeably associated with the rollers 13 so that the map can be wound from one roller to the other. A compass 16 is carried by the receptacle 1 to coöperate with the indicating arrows A on the map.

The sides of the receptacle 1 are preferably formed to provide vertical grooves 17 to receive the trunnions of the rollers 13. These slots open onto the upper edge of the receptacle so as to permit removal of the rollers when it is desired to substitute one map for another. Retaining devices 18 are provided for engaging the trunnions of the rollers so as to hold the rollers against vertical sliding movement.

I claim:—

A map holder comprising a receptacle, a support for the map located within the receptacle, a magnifying glass movably mounted in the receptacle, a member supporting the glass, the said receptacle having threaded sockets therein and threaded members connecting the glass supporting member with the receptacle and adjustable to move the glass toward the map.

In testimony whereof I affix my signature in presence of two witnesses.

PHILIP .WEBER.

Witnesses:
C. A. STONE,
GRACE G. STONE.